(12) United States Patent
Wada

(10) Patent No.: US 6,398,170 B1
(45) Date of Patent: Jun. 4, 2002

(54) WIRE HARNESS FIXING CLIP

(75) Inventor: Tetsuaki Wada, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 09/480,254

(22) Filed: Jan. 11, 2000

(30) Foreign Application Priority Data

Jan. 22, 1999 (JP) .......................................... 11-014274

(51) Int. Cl.[7] ................................................ F16L 3/08
(52) U.S. Cl. .................... 248/74.5; 248/68.1; 248/74.1; 248/74.3; 248/74.4
(58) Field of Search .......................... 248/68.1, 65, 69, 248/73, 49, 57, 74.1, 74.3, 74.4

(56) References Cited

U.S. PATENT DOCUMENTS

| | | | |
|---|---|---|---|
| 2,338,006 A | | 12/1943 | Morehouse |
| 2,397,279 A | * | 3/1946 | Vesconte .................... 248/74.3 |
| 3,376,004 A | * | 4/1968 | Goldman .................... 248/74.3 |
| 3,460,788 A | * | 8/1969 | Goldman .................... 248/74.3 |
| 3,906,592 A | * | 9/1975 | Sakasegawa et al. .......... 24/73 |
| 4,844,379 A | | 7/1989 | Umehara |
| 5,004,194 A | | 4/1991 | Watanabe |
| 5,377,940 A | * | 1/1995 | Cabe et al. ................. 248/74.3 |
| 6,012,684 A | * | 1/2000 | Umney et al. ................ 248/65 |

FOREIGN PATENT DOCUMENTS

| | | |
|---|---|---|
| EP | 683 342 | 11/1995 |
| JP | 68-83923 | 6/1988 |

* cited by examiner

*Primary Examiner*—Kimberly T. Wood
(74) *Attorney, Agent, or Firm*—Banner & Witcoff, Ltd.

(57) ABSTRACT

The invention allows upper and lower plates of a harness clip to be aligned simply, irrespective of the diameter of a wire harness.

A wire harness fixing clip (11) has a ring-like frame through which a wire harness is passed, fixing holes (12a, 13a) being provided on upper and lower plates, and a retaining member being passed through these fixing holes to fix the wire harness clip (11) to a fixture. The clip has an L-shaped side locking member (16) on one of the upper and lower plates, the other of these plates catching from the side with the locking member, the pair of plates thereby resting one above the other, on the locking member and thereby becoming aligned.

16 Claims, 5 Drawing Sheets

WIRE HARNESS FIXING CLIP

TECHNICAL FIELD

The present invention relates to a wire harness fixing clip for fixing a wire harness distributed within an automobile to a car body or the like. In particular, the clip can accommodate wire harnesses of varying diameter.

JP 63-83923 describes a type of wire harness fixing clip, wherein a joining member of a pair of upper and lower plate members comprises a ring shaped frame through which a wire harness is passed, and wherein the fixing holes are provided on the pair of upper and lower plate members, a retaining member being passed therethrough to fix the clip to the fixture, as shown in FIGS. 12–14 of this application.

This clip 1 has a hook member 1c provided on one end (on the plate member 1a) of an open anterior end of a pair of upper and lower plate members 1a and 1b. The other end (on the plate member 1b) has a fixing member 1d which connects with the hook member 1c and comprises a frame shaped receiving member or the like.

In the case where the hook member 1c and the fixing member 1d are provided on the open ends of the pair of upper and lower plate members 1a and 1b, these upper and lower plate members 1a and 1b open out when a wire harness W/H is passed through a ring shaped frame 1e provided between the plate members 1a and 1b. At this juncture, lateral slippage can easily occur between the upper and lower plate members 1a and 1b, and as a consequence, the position of the hook member 1c may no longer correspond with the fixing member 1d. Thus the two may not easily connect. In particular, in the case where the outer diameter of the wire harness W/H is large, it is difficult to correct the lateral slippage. It is difficult to align the fixing holes 1f and 1g formed on the upper and lower plate members, and it is difficult to fix the clip to a car body panel or the like.

The present invention has taken the above problem into consideration, and aims to provide a wire harness fixing clip wherein upper and lower plate members can be positioned so as to correspond without lateral slippage irrespective of the width of the outer diameter of the wire harness, the fixing holes on the upper and lower plate members therefore being easily aligned, thereby allowing the clip to be fixed simply and reliably to a fixture.

SUMMARY OF THE INVENTION

According to the invention, there is provided a wire harness fixing clip comprising a ring-like frame having an axis and being adapted to receive an elongate wire harness along said axis, said clip having substantially planar ends adapted for overlying contact, said ends each having an aperture therethrough for receiving a fixing member, wherein one of said planar ends is provided with a latching member adapted to receive an edge of the other of said planar ends, said latching member being further adapted to extend over the other of said planar ends in the direction of said axis.

Preferably, the latching member is hook-like. The latching member may extend from a side of one of said planar ends, or from a surface thereof, for example, by punching out of a metal clip.

One or both of said apertures may be elongate in a direction perpendicular to said axis, in order to accommodate a variation in the wire harness diameter.

The latching member may engage a slot in the side of the other of said planar members, and the slot is preferably longer than the width of the locking member in order to allow for variation in the wire harness diameter.

BRIEF DESCRIPTION OF THE DRAWINGS

Other features of the invention will be apparent from the following description of several preferred embodiments shown by way of example only in the accompanying drawings in which.

DESCRIPTION OF PREFERRED EMBODIMENTS

Figure 1:
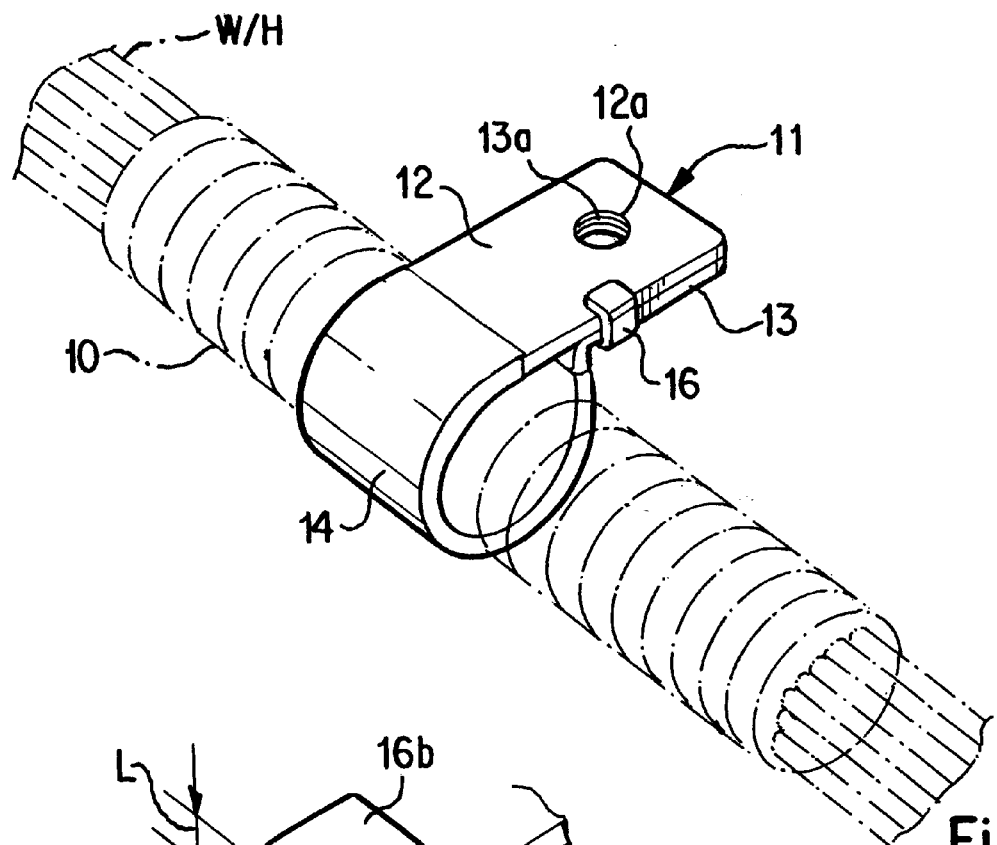
FIG. 1 is a diagonal view showing a clip of a first embodiment of the present invention.

An embodiment of the present invention is described below with the aid of FIGS. 1–6. FIG. 1 shows a wire harness W/H sheathed by a corrugated tube 10, and passing through a clip 11. The clip 11 is retained by a bolt passing through bolt holes 12a, 13a, and is thereby fixed along a wire distribution path of the wire harness within a car body.

The clip 11 is formed from metal and is provided with a ring shaped frame 14 through which the wire harness passes, this ring shaped frame 14 being formed at a joining portion of a pair of upper and lower plates 12 and 13. The clip 11 need not be formed from metal; it may equally be formed from a suitable hard plastic.

Figure 2:
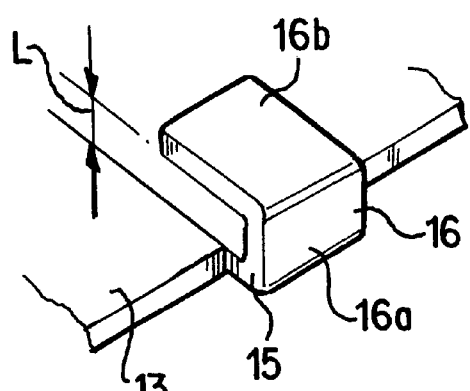
FIG. 2 is an enlarged view of part of FIG. 1.
Figure 3:
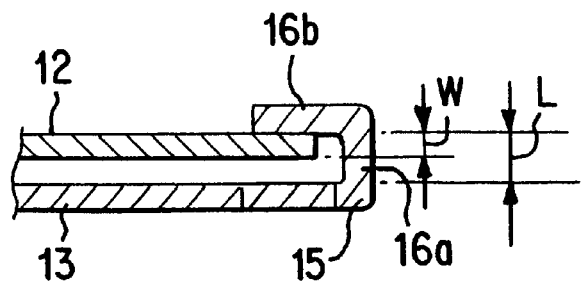
FIG. 3 is a cross-section through the part of FIG. 2.

Circular fixing holes 12a and 13a pass through plates 12 and 13. Furthermore, as shown in FIGS. 2 and 3, an extending member 15 is formed on a side face of the lower plate 13 at a location adjoining the ring shaped frame 14, this extending member 15 facing outwards and protruding slightly in a horizontal direction (as viewed). An L-shaped side locking member 16, formed in a unitary manner, protrudes from the extending member 15. This side locking member 16 comprises a vertical member 16a protruding upwards from the extending member 15, and a gripping member 16b which extends horizontally inwards from a tip of the vertical member 16a. The dimension L of the space between the gripping member 16b and the lower plate 13 is considerably greater than the plate thickness W of the upper plate 12 (FIG. 3). Consequently, a space remains between the upper plate 12 and the lower plate 13 when the upper plate 12 is engaged between the gripping member 16b and the lower plate 13.

The extending member 15 need not necessarily be provided. Moreover, in the embodiment shown in FIG. 2, the bends may be curved rather than at right angles.

Figure 4:
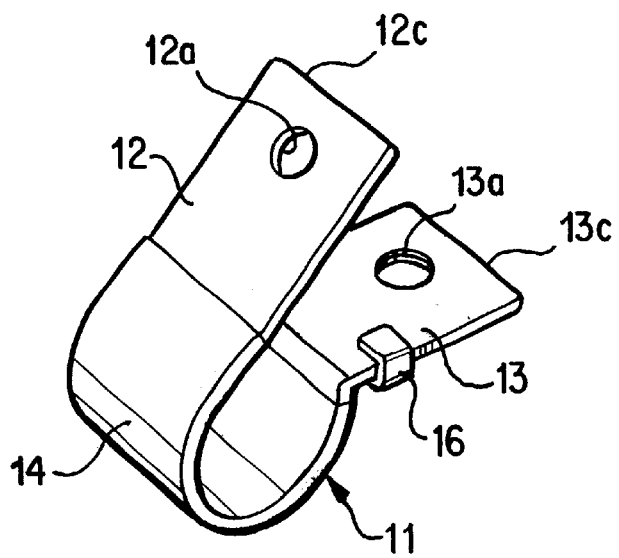
FIG. 4 is a diagonal view of the clip in an open state.

With reference to FIG. 4, the wire harness W/H sheathed in the corrugated tube 10 is passed through the upper and lower plates 12 and 13 of the clip 1 while these are in an open state, and the upper plate 12 is subsequently engaged in the side locking member 16. In order to fix the wire harness the upper and lower plates 12 and 13 are forcefully made to flare, the wire harness W/H sheathed in the corrugated tube 10 is passed through the bent frame member 14, and then the upper plate 12 is twisted slightly in a lateral direction in order to prevent interference with the gripping member 16b of the side locking member 16, and is brought into contact with the lower plate, thus going from the state shown in FIG. 5A to the state shown in FIG. 5B.

Figure 5A:
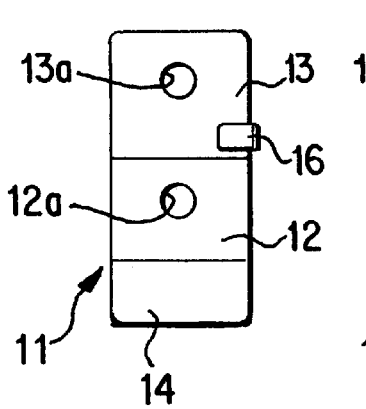
FIG. 5 shows schematic plan views of an opening-closing process of the clip.
Figure 5B:
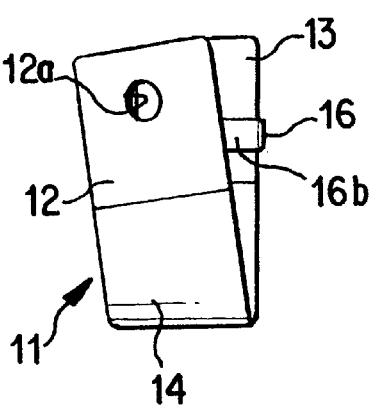
Figure 5C:
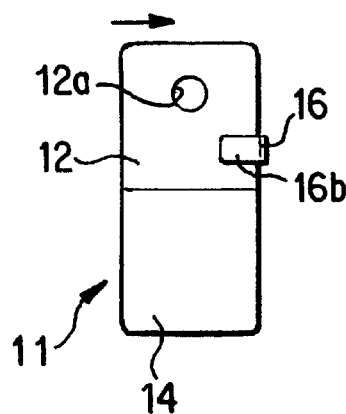
Figure 6A:
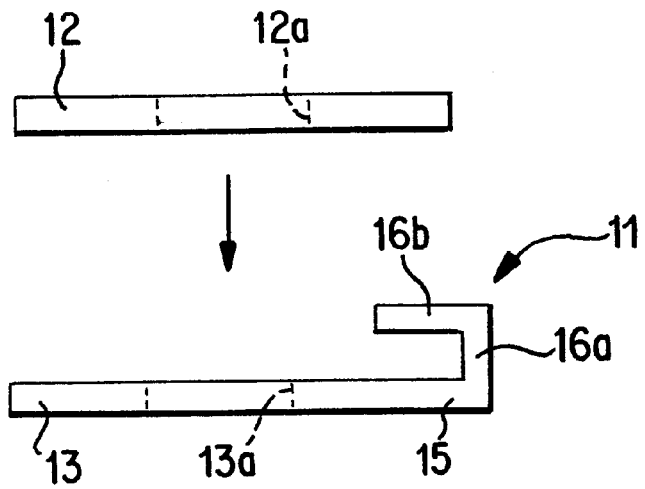
FIG. 6 shows schematic side views of the opening-closing process of the clip.
Figure 6B:
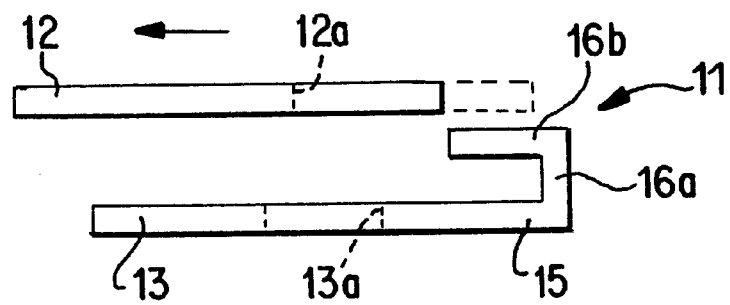
Figure 6C:
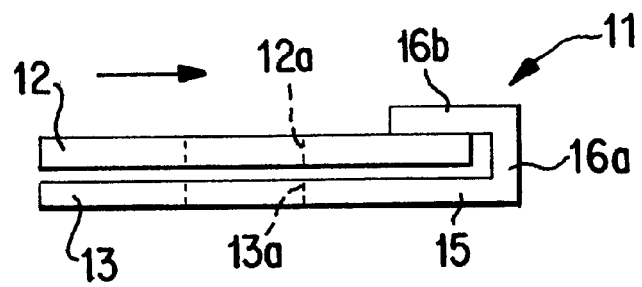

If the upper plate 12 is twisted forcefully in a lateral direction, it returns naturally to its original position and, as shown in FIG. 5C, slides into the gripping member 16b of the side locking member 16. As shown in FIG. 6A–6C, even if the upper plate 12 lies on an upper face of the gripping member 16b it may slide on the side locking member 16 and then naturally slide into the gripping member 16b. If it is difficult for the upper plate 12 to return to its original position naturally, the operator may laterally slide the upper plate 12 into the gripping member 16b.

In this manner, as shown in FIG. 1, the upper and lower plates 12 and 13 overlap precisely, and the fixing holes 12a and 13a formed in the upper and lower plates 12 and 13 are aligned. Consequently, after the fixing holes 12a and 13a have been positioned so as to correspond with the bolt holes of the fixture of the car body panel, etc., the bolt is passed therethrough and fixed by being tightened, thereby fixing the clip 11 and the wire harness.

Figure 7:
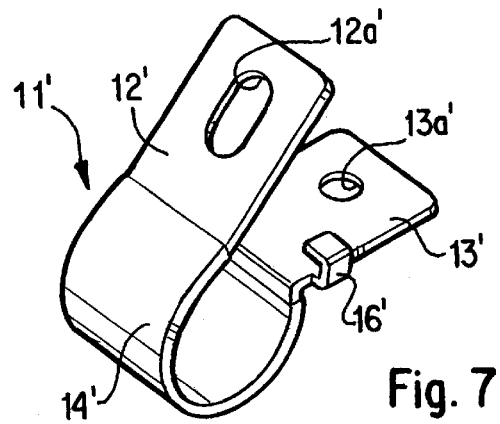
FIG. 7 is a diagonal view showing a clip of a second embodiment.

FIG. 7 shows a clip 11' of a second embodiment. A pair of upper and lower plates 12' and 13' are provided with fixing holes, these comprising a circular fixing hole 13a' provided on the lower plate 13' adjacent to a fixture, and a slot shaped fixing hole 12a' provided on the upper plate 12'.

Figure 8:
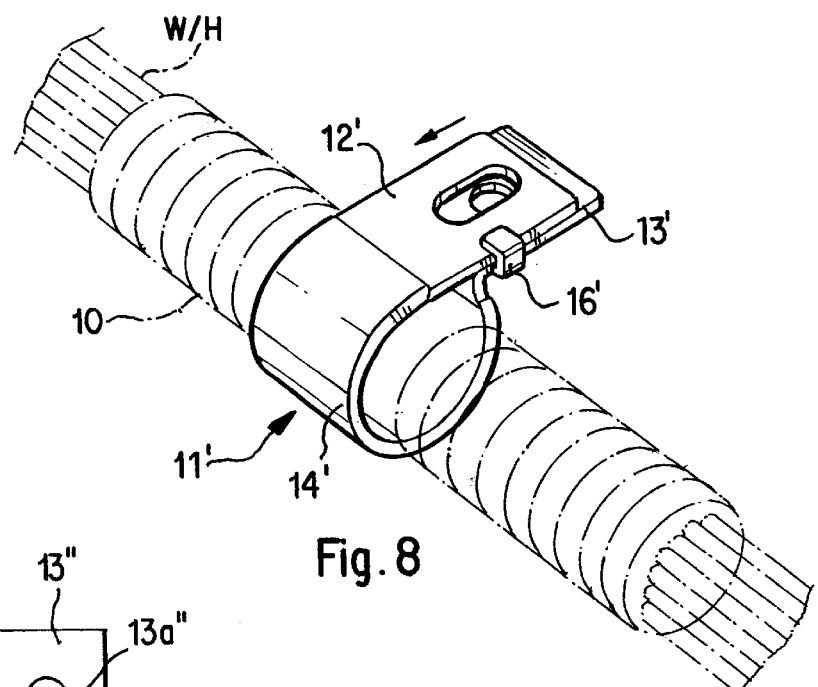
FIG. 8 is a diagonal view showing the clip of the second embodiment with a wide diameter wire harness passing therethrough.

In this configuration, as shown in FIG. 8, even if the position of the upper plate 12' should move away from the position of the lower plate 13' towards a ring shaped frame 14' because the outer diameter of a wire harness W/H is large, the position of the slot shaped fixing hole 12a' will correspond to the position of a bolt hole of the fixture while still being aligned with the circular fixing hole 13a' of the lower plate 13'.

Moreover, the shape of the fixing holes may be inverted, with the fixing hole 13a' of the lower plate 13' being slot shaped and the fixing hole 12a' of the upper plate 12' being circular. Alternatively, both the fixing hole 12a' and the fixing hole 13a' may be slot like.

Figure 9C:
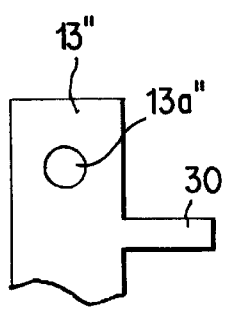
FIG. 9 shows explanatory figures relating to the operation of a third embodiment.
Figure 9A:
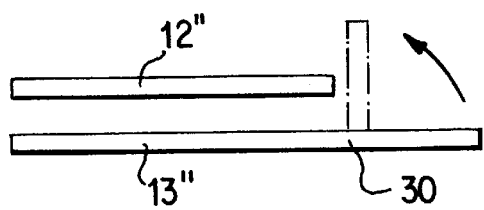
Figure 9B:
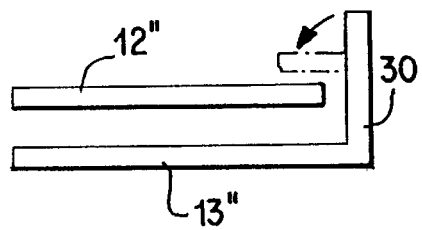

FIGS. 9A and 9B show a third embodiment. A side locking member having an inverted L-shape is not formed in advance. Instead, as shown in FIG. 9A, a long member 30 protrudes in a horizontal direction from a side face of the plate (a lower plate 13). As shown in FIG. 9B, the length of the vertical portion of the member 30 is adjusted depending on the outer diameter of the wire harness so as to form an inverted L-shape. In this case, the member 30 is thin in order for it to bend easily. In this manner, the size of the vertical portion of the inverted L-shaped side locking member can be regulated so as to correspond to the diameter of the wire harness. Consequently, the locking member can easily be made to correspond even with a wire harness having a varying diameter. FIG. 9C shows a partial plan view, on a reduced scale, of the member 30 in the unbent state.

Figure 10:
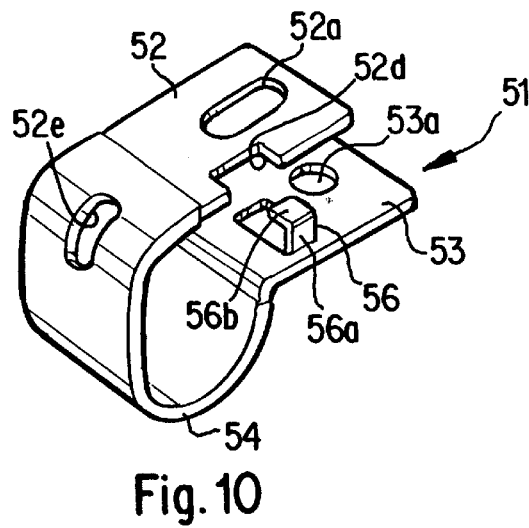
FIG. 10 is a diagonal view showing a clip of a fourth embodiment.

FIG. 10 shows a wire harness fixing clip 51 of a fourth embodiment. An inverted L-shaped side locking member 56 does not protrude from a side face of a lower plate 53. Instead, the side locking member 56 protrudes from an inner upper face of the lower plate 53. This side locking member 56 is formed by punching out a portion of the lower plate 53 so that a side face of this punched portion remains attached thereto, the punched portion is bent to form the side locking member 56 which has a vertical member 56a and a gripping member 56b. This embodiment allows the number of manufacturing steps to be decreased when the clip 51 is formed from metal or the like.

A cut-away member 52d is formed by cutting away a side portion of an upper plate 52 at a location corresponding to the side locking member 56. The length of the cut-away member 52d in a longitudinal direction is longer than the width of the side locking member 56. Further, a slot-shaped punched member 52e is formed at a location close to a central portion of a member which joins the upper plate 52 and ring shaped frame 54. The shape, etc., of fixing holes 52a and 53a formed on the upper and lower plates 52 and 53 is identical with that of the fixing holes of the first and second embodiments.

When the clip 51 is to be fixed to the wire harness, the side locking retainer 56 of the lower plate 53 is housed within the cut-away member 52d of the upper plate 52, and lower face of the gripping member 56b grips an upper face of the upper plate 52. Moreover, even if the diameter, etc., of the corrugated tube within which the wire harness is fixed is increased or decreased, the length of the cut-away member 52d in a longitudinal direction is ample relative to the width of the side locking member 56. Consequently, it can be made to correspond to the diameter of the tube and fit therewith. Furthermore, when the upper plate 52 is bent from an open state towards the lower plate 53, the punched member 52e reduces the resistance of the upper plate 52, allowing bending to occur with this location as the fulcrum. As a result, the positions of the upper plate 52 and the lower plate 53 can easily be made to correspond. Further, less force is required for bending.

Figure 11:
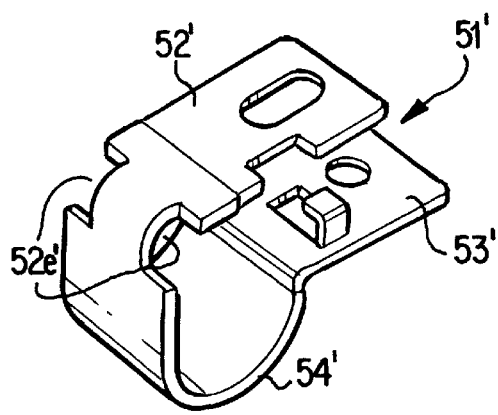
FIG. 11 is a diagonal view showing a fifth embodiment and, FIGS. 12–14 show a prior art wire harness clip.
Figure 12:
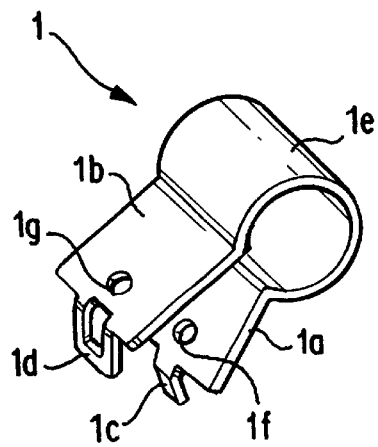
Figure 13:
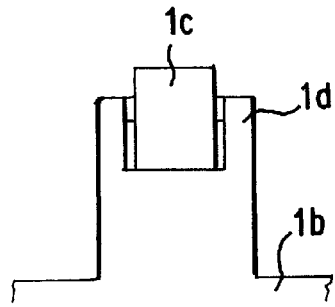
Figure 14:
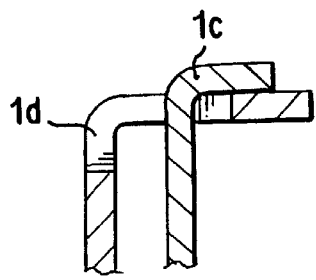

The punched member 52e need not be slot shaped. It may equally well be round or square. Furthermore, as shown in FIG. 11, the location of the punched member 52e need not be central. Rather, punched members 52e' may be formed on both sides of the upper plate 52. This punched member 52e is suitable not only for the clip 51 of the fourth embodiment, but also for the clips of the first to third embodiments.

What is claimed is:

1. A fixing clip comprising an elongate member having a medial portion defining an annular frame extending about an axis for receiving an elongate wire harness therethrough and first and second generally planar end portions positioned to oppose each other, each end portion including an aperture, the apertures being aligned to receive therethrough a fastener with an enlarged head, one of said apertures being elongated relative to the other aperture in a direction generally transverse to the axis to accommodate a relative change in position between the first and second end portions, the elongated aperture having a generally constant width that is less than the head of the fastener, and the first end portion including a side edge extending generally transverse to the axis and a latching member projecting from a portion of the first end portion generally in the direction of the axis, the latching member overlying the second end portion.

2. A clip according to claim 1 wherein said latching member is hook shaped.

3. A clip according to claim 2 wherein said latching member comprises an upstanding limb substantially perpendicular to the corresponding planar end portion, and a transverse limb in a plane substantially parallel to the plane of said respective planar end portion.

4. A clip according to claim 3 wherein said latching member extends from the surface of first planar end portion.

5. A clip according to claim 4 wherein said clip is of metal, and said latching member is punched out of first planar end portion.

6. A clip according to claim 4 wherein said latching member engages a recess in an edge of the second end portion.

7. A clip according to claim 5 wherein said latching member engages a recess in an edge of the second end portion.

8. A clip according to claim 6 wherein said recess is longer than said latching member is wide.

9. A clip according to claim 7 wherein said recess is longer than said latching member is wide.

10. A clip according to claim 1 wherein said frame includes a cut-out in the medial portion thereof, said cut-out being adapted to enhance flexibility of said frame about said axis.

11. A clip according to claim 10 wherein said cut-out is an aperture.

12. A clip according to claim 10 wherein said cut-out is an edge recess.

13. A fixing clip in accordance with claim 1 wherein a side edge of the front end portion includes a notch and the latching member projects outward in the notch without extending beyond the side edge second end portion.

14. A fixing clip comprising an elongate member having a medial portion defining an annular frame extending about an axis for receiving an elongate wire harness therethrough and first and second generally planar end portions positioned to oppose each other, each end portion including an aperture, the apertures being aligned to receive therethrough a fastener, one of the first and second end portions further including a side edge extending generally transverse to the axis, a notch in a medial portion of the side edge, and a latching member projecting outward in the notch generally in the direction of the axis without extending beyond the side edge, the latching member overlying the one of the first and second end portions.

15. A clip according to claim 14 wherein one of said apertures is elongate in a direction transverse to said axis.

16. A clip according to claim 14 wherein both of said apertures are elongate in a direction transverse to said axis.

* * * * *

UNITED STATES PATENT AND TRADEMARK OFFICE
CERTIFICATE OF CORRECTION

PATENT NO. : 6,398,170 B1
DATED : June 4, 2002
INVENTOR(S) : Tetsuaki Wada

It is certified that error appears in the above-identified patent and that said Letters Patent is hereby corrected as shown below:

Column 4,
Line 58, insert -- further -- after "portion".

Column 5,
Line 4, insert -- said -- after "surface of".
Line 6, insert -- said -- after "out of".

Column 6,
Line 2, change "front" to -- second --.
Line 4, insert -- of the -- after "second edge".

Signed and Sealed this

Twenty-ninth Day of October, 2002

Attest:

JAMES E. ROGAN
Attesting Officer          Director of the United States Patent and Trademark Office